United States Patent [19]

Puckett et al.

[11] Patent Number: 5,401,881
[45] Date of Patent: Mar. 28, 1995

[54] SULFUR-CONTAINING QUATERNARY AMMONIUM IONENE POLYMERS AND THEIR USE AS MICROBICIDES

[75] Inventors: Wallace E. Puckett; Mark L. Zollinger; Fernando D. Corral, all of Memphis, Tenn.

[73] Assignee: Buckman Laboratories International, Inc., Memphis, Tenn.

[21] Appl. No.: 928,356

[22] Filed: Aug. 12, 1992

[51] Int. Cl.$^6$ .............. C07C 211/63; C07C 215/40; A01N 33/12
[52] U.S. Cl. ................................ 564/295; 504/100; 504/160; 564/292
[58] Field of Search ............... 514/642; 504/100, 160; 564/292, 295

[56] References Cited

U.S. PATENT DOCUMENTS

| | | | |
|---|---|---|---|
| 2,881,070 | 4/1959 | Pera | 92/3 |
| 3,874,870 | 4/1975 | Green et al. | 71/67 |
| 3,931,319 | 1/1976 | Green et al. | 260/567.6 |
| 4,025,627 | 5/1977 | Green et al. | 424/248.4 |
| 4,027,020 | 5/1977 | Green et al. | 424/248.56 |
| 4,046,750 | 9/1977 | Rembaum | 526/310 |
| 4,217,914 | 8/1980 | Jacquet et al. | 132/7 |
| 4,506,081 | 3/1985 | Fenyes et al. | 548/523 |
| 4,874,532 | 10/1989 | Worley | 210/755 |

FOREIGN PATENT DOCUMENTS

299706A7 5/1992 Germany.

OTHER PUBLICATIONS

A. Rembaum, "Biological Activity of Ionene Polymers", Applied Polymer Symposium, No. 22, pp. 299-317, (1973).

Chemical Abstracts, vol. 112, No. 15, Abstract No. 133993d (Apr. 9, 1990).

*Primary Examiner*—Peter O'Sullivan
*Attorney, Agent, or Firm*—Finnegan, Henderson, Farabow, Garrett & Dunner

[57] ABSTRACT

Sulfur-containing quaternary ammonium ionene polymers which are useful as microbicides for controlling the growth of microorganisms in aqueous systems and on surfaces, as well as for inhibiting slime formation in aqueous systems and biocidal compositions containing effective amounts of the sulfur-containing quaternary ammonium ionene polymers.

16 Claims, No Drawings

SULFUR-CONTAINING QUATERNARY AMMONIUM IONENE POLYMERS AND THEIR USE AS MICROBICIDES

This invention relates to sulfur-containing quaternary ammonium ionene polymer and their use as microbicides. New sulfur-containing quaternary ammonium ionene polymers are described, as well as methods for their preparation. Microbicidal compositions and methods for inhibiting the growth of microorganisms employing sulfur-containing quaternary ammonium ionene polymers are also disclosed.

A large number of commercial, industrial, agricultural, and wood products are subject to microbiological attack which reduces or destroys their economic value. Examples of materials that may be subject to microbiological degradation are surface coatings, wood, agricultural seed, leather and plastics, including flexible plastics.

The temperature at which these products are stored and their intrinsic characteristics make these products susceptible to the growth of microorganisms. These microorganisms can be introduced during the manufacturing of these products by exposure to air, tanks, pipes, equipment, and humans and/or during their use from multiple openings and reclosures of packaged products and by the introduction of contaminated objects to stir or remove material.

Aqueous systems containing organic materials are also highly subject to microbiological attack. Such aqueous systems include latexes, surfactants, dispersants, stabilizers, thickeners, adhesives, starches, waxes, proteins, emulsifying agents, detergents, cellulose products, agricultural irrigation fluids, and resins formulated in aqueous solutions, emulsions or suspensions.

These systems frequently contain relatively large amounts of water causing them to be well-suited environments for microbiological growth and, thus, attack and degradation. Microbiological degradation of aqueous systems containing organic materials may manifest itself as a variety of problems, such as loss of viscosity, gas formation, objectionable odors, decreased pH, emulsion breaking, color change, and gelling.

Another objectionable phenomenon occurring in industrial process systems involving water is slime formation. Slime consists of matted deposits of microorganisms, fibers and debris. It may be stringy, pasty, rubbery, tapioca-like, or hard, and may have a characteristic undesirable odor that is different from that of the liquid suspensions in which it is formed.

The microorganisms primarily involved in slime formation are different species of spore-forming and non-spore-forming bacteria, in particular capsulated forms of bacteria which secrete gelatinous substances that envelop or encase the cells. Slime microorganisms also include filamentous bacteria, filamentous fungi of the mold type, yeasts, and yeast-like organisms. Slime reduces yields in paper production and causes plugging and other problems in water systems.

In addition, different types of water, both potable and nonpotable, need disinfectants to keep them from being spoiled by microorganisms. In the United States, the most common method of disinfection is the use of chlorination.

Chlorination, however, can be accompanied by some disadvantages, such as chlorine gas explosion or leakage, during water treatment, and may result in the formation of toxic halocarbons, such as chloroform and others. In this respect, a variety of compounds are used as replacements for chlorine treatment, including ozone, chlorine dioxide, bromine, potassium permanganate, p-chlorosulfamidobenzoic acid, cyanuric acid derivatives, isocyanuric acid derivatives, quaternary ammonium compounds, and various chloramine compounds.

Quaternary ammonium ionene polymers belong to a class of compounds, which, together with methods for their preparation, are described in U.S. Pat. Nos. 3,874,870, 3,931,319, 4,025,627, 4,027,020, and 4,506,081, as well as the references cited in these patents. These polymers are often used as microbicides. The disclosure of each of these patents is incorporated herein by reference.

Certain sulfur-containing quaternary ammonium ionene polymers and methods to prepare them are also known. U.S. Pat. No. 4,046,750 describes an ionene polymer containing a sulfur diradical, —S—, which is used to modify polymeric beads for use in binding a diverse group of small and large anionic compounds in separation, analytical, diagnostic and clinical applications. U.S. Pat. No. 4,217,914 describes sulfur-containing quaternary ammonium ionene polymers which have divalent sulfur-containing radicals, —S—, —S—S—, —SO— and —SO$_2$—, and their use in cosmetic compositions. The disclosure of each of these patents is incorporated herein by reference.

An object of the present invention is to provide new sulfur-containing quaternary ammonium ionene polymers which are useful as microbicides. A second object is to provide a microbicidal composition employing a sulfur-containing quaternary ammonium ionene polymer as an active ingredient. Providing a method for inhibiting the growth of microorganisms in aqueous fluid systems or on surfaces using a sulfur-containing quaternary ammonium ionene polymer is a third object of this invention. Other objects of this invention will be apparent from the description of the invention below or from the practice of the invention.

These and other objects may be accomplished by:
an ionene polymer comprising recurring units of formula I:

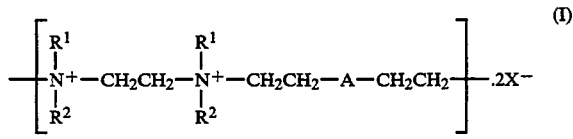

wherein $X^-$ is a counter-ion; $R^1$ and $R^2$ which can be the same or different, are selected from a lower alkyl group and —CH$_2$CH$_2$OH; and A is a radical selected from —S—, —S—S—, —S—CH$_2$CH$_2$—S— and the oxidation products of —S—, —S—S—, and of —S—CH$_2$CH$_2$—S—;

a microbicidal composition comprising an aqueous solution of a sulfur-containing quaternary ammonium polymer comprising recurring units of formula II:

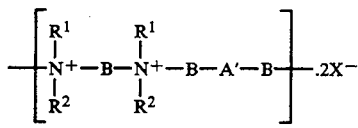

wherein $X^-$ is a counter-ion; $R^1$ and $R^2$ which can be the same or different, are selected from a lower alkyl group and $-CH_2-CH_2-OH$;

A' is a radical selected from $-S-$, $-S-CH_2CH_2-S-$, $-S-S-$ and the oxidation products of $-S-$, of $-S-CH_2CH_2-S-$ and of $-S-S-$; and B is a radical selected from $C_1-C_5$alkylene, $-CH_2-CH(OH)-CH_2-$, and $-(CH_2)_m-O-(CH_2)_m-$, where m is 1, 2, or 3; in an amount effective to inhibit the growth of at least one microorganism; and a method for inhibiting the growth of at least one microorganism in an aqueous system or on a surface susceptible to such growth comprising the step of adding to an aqueous system, in an amount effective to inhibit the growth of the microorganism, the sulfur-containing quaternary ammonium polymer comprising recurring units of formula II, above.

The present invention provides novel sulfur-containing quaternary ammonium ionene polymers comprising recurring units of formula I:

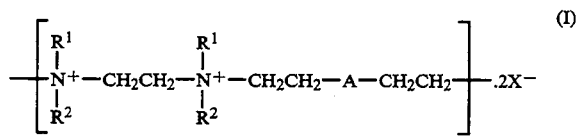

wherein $X^-$ is a counter-ion; $R^1$ and $R^2$ which can be the same or different, are selected from a lower alkyl group and $-CH_2CH_2OH$; and A is a radical selected from $-S-$, $-S-CH_2CH_2-S-$ and the oxidation products of $-S-$, and of $-S-CH_2CH_2-S-$.

The counter-ion, $X^-$, may be a monovalent anion or $2X^-$ may be a divalent anion. One of ordinary skill would appreciate that different counter-ions can be selected by ion exchange. Preferably, $X^-$ is a halogen anion; more preferably, chloride.

The substituents $R^1$ and $R^2$ are lower alkyl groups or $-CH_2CH_2OH$, preferably $C_1-C_4$alkyl groups. More preferably, these substituents are methyl or ethyl groups.

A is a radical selected from $-S-$, $-S-CH_2CH_2-S-$ and the oxidation products of $-S-$, and of $-S-CH_2CH_2-S-$. The oxidation products of the sulfur-containing radical A are those products obtained by oxidizing the sulfur atoms within each radical. For example, the oxidation products resulting from the oxidation of an ionene polymer when A is $-S-$, are ionene polymers where A is $-SO-$ after a first oxidation and where A is $-SO_2-$ after a second oxidation. As described below, it is possible to control the amount of oxidation to obtain ionene polymers having the sulfur atoms within the sulfur-containing radical A at a desired oxidation state. The sulfur-containing radical A is preferably $-S-$, $-SO-$, or $-SO_2-$ and more preferably $-SO-$ or $-SO_2-$.

The molecular weight of the sulfur-containing quaternary ammonium ionene polymers may generally range from 1,000-5,000, preferably 1,000-3,000 and most preferably 1500.

In a preferred embodiment, X is chloride; $R^1$ and $R^2$ are each methyl; A is $-S-$, $-SO-$, or $-SO_2-$; and the polymer has a molecular weight of about 1500.

In general, the sulfur-containing ionene polymers of formula I can be prepared by reacting a suitable diamine, such as tetramethylenediamine (TMEDA), with an appropriate dihaloalkyl sulfide, e.g. 2,2'-dichloroethyl sulfide, at a temperature of 50°-90° C., preferably about 60° C., for several hours in water. The reaction can proceed cleanly, with no side products formed, to advantageously yield a polymer-in-water solution that may be used as is or diluted to an appropriate strength. No further workup is required.

To obtain sulfur-containing quaternary ammonium ionene polymers having sulfur-containing radicals where the sulfur atoms are oxidized, the ionene polymer product solution is oxidized by means known in the art, such as by reaction with hydrogen peroxide. The degree of oxidation is controlled by the reaction stoichiometry. Completion of the oxidation can be monitored by tests for the presence of peroxide as is known in the art, such as a starch/iodine test. This oxidation reaction also proceeds cleanly giving a polymer-in-water solution that may be used as is or diluted to an appropriate strength without further workup. The present invention is also directed to the use of sulfur-containing quaternary ammonium polymers comprising recurring units of formula II:

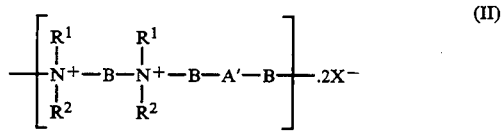

as microbicides In these polymers, $X^-$, $R^1$ and $R^2$ are the same as defined above for the monomers of formula I.

A' is a radical selected from $-S-$, $-S-CH_2CH_2-S-$, $-S-S-$ and the oxidation products of $-S-$, of $-S-CH_2CH_2-S-$ and of $-S-S-$. The oxidation products may be obtained in the same manner as those of formula I. Preferably A' is $-S-$, $-SO-$, $-SO_2-$, or $-SO_2-S-$ and more preferably $-SO-$ or $-SO_2-$. The preparation of sulfur-containing quaternary ammonium ionene polymers where A' is $-S-$, $-S-S-$, $-SO-$, $-SO_2-$ is described in U.S. Pat. No. 4,217,914 and is incorporated herein by reference.

B is a radical selected from $C_1-C_5$alkylene, $-CH_2-CH(OH)-CH_2-$, and $-(CH_2)_m-O-(CH_2)_m-$, where m is 1, 2, or 3. Preferably, B is a $C_1-C_3$alkyl and more preferably on ethyl group.

The molecular weight of the ionene polymers may generally range from 1,000-5,000. A preferable range is 1,000-3,000. Most preferably the molecular weight is about 1500.

The sulfur-containing quaternary ammonium ionene polymers of the present invention are effective microbicides against microorganisms such as bacteria, algae and fungi. It has been found that sulfur-containing quaternary ammonium ionene polymers are particularly useful for inhibiting the growth of such microorganisms in aqueous systems. Thus, the present invention relates to a method of inhibiting the growth of at least one microorganism in an aqueous system comprising the step of adding to an aqueous system a sulfur-containing quaternary ammonium ionene polymer in an amount effective to inhibit the growth of at least one microorganism. Representative aqueous systems include aqueous solutions, emulsions and suspensions as described above. Specific preferred systems are metalworking fluids.

Sulfur-containing quaternary ammonium ionene polymers have also been found to be useful for inhibiting the formation of slime in an aqueous system. The present invention, then, also relates to a method for inhibiting the formation of slime in aqueous systems comprising the step of adding to an aqueous system a sulfur-containing quaternary ammonium ionene polymer in an amount effective to inhibit the formation of slime. This method is effective in aqueous systems such as a pulp slurry or liquids used in a water cooling device.

A further use of sulfur-containing quaternary ammonium ionene polymers according to the present invention resides in a method for inhibiting the growth of at least one microorganism on a substance susceptible to deterioration or disfigurement by microorganisms or metabolic products of microorganisms. The method comprises the step of applying or admixing with the substance the sulfur-containing quaternary ammonium ionene polymer in an amount effective to inhibit the growth of at least one microorganism. This method is effective on substances such as wood, surface coatings (i.e. paint films), leather, agricultural seed, man-made or naturally occurring polymers (including flexible plastic) and the like. This method of inhibiting the growth of microorganisms on surfaces achieves the desired inhibition for significant periods of time. The microorganisms whose growth are inhibited include, for example, fungi. Additionally, the sulfur-containing quaternary ammonium ionene polymers described here are effective contact disinfectants.

The present invention also relates to biocidal compositions comprising an effective amount of a sulfur-containing quaternary ammonium ionene polymer in an aqueous solution. The biocidal composition can contain other additives such as surfactants and defoamers, for example, as are known in the art. A biocidal composition containing a sulfur-containing quaternary ammonium ionene polymer can be used in any of the methods described above.

According to the present invention, inhibition of the growth of at least one microorganism or of slime formation encompasses the prevention, control and/or reduction of that growth or formation. Therefore, for example, the inhibition of the growth of at least one microorganism in an aqueous fluid can be achieved by preventing such growth in the first instance, preventing or controlling further growth if such has already occurred, and/or reducing the amount of any existing growth.

The use of sulfur-containing quaternary ammonium ionene polymers as microbicides has a number of advantages over the microbicides hitherto available. They are hydrolytically stable over a wide pH range, i.e. pH 3-11. They are soluble in many solvents, such as water, small chain alcohols and some polar organic solvents, and therefore may be readily diluted for convenience of use. Their compatibility, low color, and efficiency makes them advantageous for use as microbicides in manmade or naturally occurring polymers and for impregnation in or application on surfaces such as wood, paper, or other materials.

The sulfur-containing quaternary ammonium ionene polymers may, of course, be applied in various ways—incorporated into a coating or composition, applied as dust by mixing with powdered diluents, dissolved in a solvent or in water and then emulsified and dispersed into a non-solvent. The particular use desired will generally dictate the method of application.

The effective amount or percentage of active compound necessary to achieve the desired result will vary somewhat depending on the substrate to be protected, the conditions for algal, bacterial or fungal growth, and the degree of protection desired. For the treatment of surfaces or materials, the concentration of a sulfur-containing quaternary ammonium ionene polymer according to the present invention generally ranges from about 0.01 to 0.5 ppm (w/w); preferably 0.01 to 0.1 ppm, and more preferably 0.01 to 0.025 ppm in the composition applied. With aqueous systems, a preferred effective amount of active compound ranges from 0.05 to 5000 ppm, and more preferably, from 0.05 to 1000 ppm of the aqueous system. The amount of sulfur-containing quaternary ammonium ionene polymer effective to prevent the formation of slime in an aqueous liquid preferably ranges from 10 to 100 ppm, and more preferably, from 5 to 25 ppm of the aqueous liquid.

To illustrate the nature of the invention, the following examples are given. It should be understood, however, that the invention is not to be limited to the specific conditions or details set forth in these examples.

EXAMPLE 1

Preparation of poly[thioethylene(dimethyliminio)ethylene(dimethyliminio)ethylene], (Compound 1)

A solution of 17.4 g TMEDA (0.15 moles), 23.85 g 2,2'-dichloroethyl sulfide (0.15 moles), and 25.76 g water was prepared in a reactor. The contents were heated to 60° C. for seven and one-half hours, with continuous mixing. After two hours, the contents were in a single, aqueous phase. The reactor was then allowed to cool to room temperature. The product polymer-in-water solution was diluted to an appropriate concentration and used in the Examples below.

EXAMPLE 2

Preparation of poly[sulfoxyethylene(dimethyliminio)ethylene (dimethyliminio)ethylene] (Compound 2)

A solution of 17.4 g TMEDA (0.15 moles), 23.85 g 2,2'-di-chloroethyl sulfide (0.15 moles), and 25.76 g water was prepared. The contents of the reactor were heated to 60° C. for seven and one-half hours, with continuous mixing. After two hours, the contents were in a single, aqueous phase. The reactor was then allowed to cool to room temperature.

17.0 g of a 30% solution of hydrogen peroxide were then added portion-wise to the reaction flask. After four hours, a standard starch/iodine test for peroxide indicated a negative result. The product polymer-in-water solution was diluted to an appropriate concentration and used in the Examples below.

EXAMPLE 3

The effect of sulfur-containing quaternary ammonium ionene polymers on the bacteria *Enterobacter aerogenes* and/or *Pseudomonas aeruginosa* and the effect on algae were determined using the method described in U.S. Pat. No. 2,881,070 (the disclosure of which is incorporated herein by reference). The results are described in Table 1 and Table 2.

TABLE 1

Concentration in parts per million (ppm) required for 90% or greater kill of the ionene polymers, Compounds 1 and 2, against the bacteria *Enterobacter aerogenes* and *Pseudomonas aeruginosa* at pH 6 and pH 8 in a basal salt substrate after 18 hours contact.

| Compound | Bacterium | pH 6 | pH 8 |
|---|---|---|---|
| 1 | *Enterobacter aerogenes* | 0.5 | 0.05 or less |
| 1 | *Pseudomonas aeruginosa* | 0.7 | 0.5 |
| 2 | *Enterobacter aerogenes* | 0.7 | 0.5 |

TABLE 2

Minimum Inhibitory Concentration of the ionene polymers of Compounds 1 and 2 in parts per million (ppm) against the algae *Chlorella pyrenoidosa*, *Chlorococcum hypnosporum* and *Oscillatoria prolifera* at pH 7 in a basal salt substrate after 28 days contact.

| Algae | Compound 1 | Compound 2 |
|---|---|---|
| *Chlorella pyrenoidosa* | 5.0 | 2.0 |
| *Chlorococcum hypnosporum* | 1.0 | 2.0 |
| *Oscillatoria prolifera* | 5.0 | 1.0 |

EXAMPLE 4

Determination of the Zone of Inhibition of the Ionene Polymer Compound 1 Against Various Fungi The technique utilized was a standard agar diffusion method in which biological activity of the test chemical is expressed as a zone of inhibition encircling the point of application. In the test, paper discs (6 mm diameter) were dipped in aqueous solutions of the ionene polymer, respectively containing $10^3$, $10^4$, and $10^5$ ppm of the active ingredient. After briefly air drying, the treated discs were placed at the center of potato dextrose agar plates freshly streaked with one of several species of the organisms listed in Table 3. Following incubation for ten days, the zone diameters were determined, with the results listed in Table 3.

TABLE 3

Zone of inhibition, in millimeters, of *Aspergillus niger*, *Trichoderma harzianum*, *Penicillium roqueforti*, and *Aureobasidium pullulans* versus the ionene polymer concentrations used.

| Ionene concentration ppm: | $10^3$ | $10^4$ | $10^5$ |
|---|---|---|---|
| Organism | Zone diameter (mm) | | |
| *Aspergillus niger* | 0 | 0 | 18 |
| *Trichoderma Harzianum* | 0 | 0 | 6 |
| *Penicillium roqueforti* | 8 | 14 | 25 |
| *Aureobasidium pullulans* | 0 | 10 | 15 |

EXAMPLE 5

The effectiveness of sulfur-containing quaternary ammonium ionene polymer compositions as contact disinfectants in short contact suspension screens was examined using a mixed bacterial population comprised of *Staphylococcus aureus*, *Enterobacter aerogenes* and *Pseudonomas aeruginosa*. Each microorganism was grown in Tryptone Glucose extract agar (TGEA) and harvested after 24 hours. A bacterial suspension was prepared in saline with each organism and adjusted by aid of a McFarland #1 turbidity Standard to equal approximately $1.0 \times 10^8$ cell/ml. Equal portions of each adjusted bacterial suspension was mixed and employed as the inoculum. The day of the assay a freshly prepared stock solution of the biocide was made up (1%) and diluted to the desired concentration in sterile distilled water. Ten (10.0) milliliters of the diluted biocide was dispensed in sterile test tubes and 20 microliters of the inoculum was introduced and timed for exactly 10.0 minutes. After exposure, each 1.0 milliliter was transferred to 9 milliliters of a biocide deactivating solution. After the deactivation, serial ten-fold dilutions were prepared in 9 ml sterile saline blanks. Bacterial survivors were estimated by standard pour platting technique employing TGEA. All plates were incubated at 37° C. for 48 hours and counted. Controls were treated similarly with the exception that no biocide was used, only sterile distilled water.

The results are shown below in Table 4. Both compounds 1 and 2 have fast acting anti-bacterial action equal to or better than Benzalkonium Chloride (Ben.Cl), a quaternary ammonium salt routinely employed for sanitizing and disinfecting.

TABLE 4

Short contact efficacy of Compounds 1, 2 and Benzalkonium Chloride

| | % REDUCTION (10 min exposure) Concentration (ppm) | | | |
|---|---|---|---|---|
| Compound | 50 | 100 | 250 | 500 |
| 1 | 99.91 | 99.93 | 99.93 | 99.95 |
|   | 99.98 | 99.99 | 99.99 | 99.98 |
| 2 | 96.99 | 97.47 | 97.15 | 98.53 |
| Ben. Cl | 83.44 | 86.29 | 99.68 | 99.99 |

The claimed invention is:

1. A method for inhibiting the growth of microorganisms or algae in an aqueous system comprising the step of adding to an aqueous system a sulfur-containing quaternary ammonium polymer consisting essentially of recurring units of the formula I:

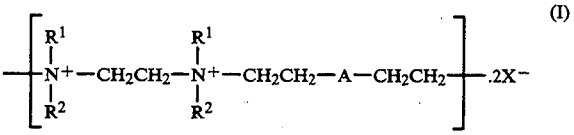

wherein $X^-$ is a counter-ion; $R^1$ and $R^2$ which can be the same or different, are selected from a lower alkyl group and $-CH_2CH_2OH$; and A is a radical selected from $-S-$, $-S-CH_2CH_2-S-$ and the oxidation products of $-S-$, and of $-S-CH_2CH_2-S-$; wherein the molecular weight of said polymer ranges from 1,000 to 5,000; and wherein the polymer is added in an amount effective to inhibit the growth of at least one microorganism or algae in the aqueous system.

2. The method of claim 1 wherein the ionene polymer is selected from poly[thioethylene(dimethyliminio)ethylene(dimethyliminio)ethylene] and poly[sulfoxyethylene(dimethyliminio)ethylene(dimethyliminio)ethylene].

3. The method of claim 1 wherein the aqueous system is a metalworking fluid.

4. The method of claim 2 wherein the aqueous system is a metalworking fluid.

5. The method of claim 2 wherein the ionene polymer is present in an amount ranging from 0.05 to 5000 ppm of the aqueous system.

6. A method for inhibiting slime formation in an aqueous system comprising the step of adding to an aqueous system a sulfur-containing quaternary ammonium polymer consisting essentially of recurring units of formula I:

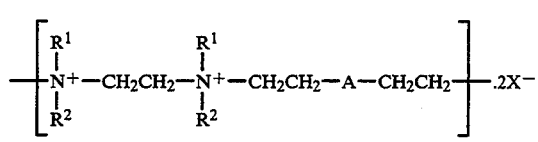

wherein $X^-$ is a counter-ion; $R^1$ and $R^2$, which can be the same or different, are selected from a lower alkyl group and $-CH_2CH_2OH$; and A is a radical selected from $-S-$, $-S-CH_2CH_2-S-$ and the oxidation products of $-S-$, and of $-S-CH_2CH_2-S-$; wherein the molecular weight of said polymer ranges from 1,000 to 5,000; and wherein the polymer is added in an amount effective to inhibit slime formation in the aqueous system.

7. The method of claim 6 wherein the ionene polymer is selected from poly[thioethylene(dimethyliminio)ethylene(dimethyliminio)ethylene] and poly[sulfoxyethylene(dimethyliminio)ethylene(dimethyliminio)ethylene].

8. The method of claim 6 wherein the aqueous system is a metalworking fluid.

9. The method of claim 7 wherein the aqueous system is a metalworking fluid.

10. The method of claim 9 wherein the ionene polymer is present in an amount ranging from 0.05 to 5000 ppm of the aqueous system.

11. A method for inhibiting the growth of microorganisms on the surface of a substance comprising the step of applying to the surface a sulfur-containing quaternary ammonium polymer consisting essentially of recurring units of formula I:

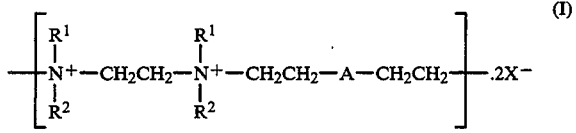

wherein $X^-$ is a counter-ion; $R^1$ and $R^2$, which can be the same or different, are selected from a lower alkyl group and $-CH_2CH_2OH$; and A is a radical selected from $-S-$, $-S-CH_2CH_2-S-$ and the oxidation products of $-S-$, and of $-S-CH_2CH_2-S-$; wherein the molecular weight of said polymer ranges from 1,000 to 5,000; and wherein the polymer is applied in an amount effective to inhibit the growth of at least one microorganism on the surface.

12. The method of claim 11 wherein the ionene polymer is selected from poly[thioethylene(dimethyliminio)ethylene(dimethyliminio)ethylene] and poly[sulfoxyethylene(dimethyliminio)ethylene(dimethyliminio)ethylene].

13. The method of claim 12 wherein the substance is wood, paper, plastic, leather, a seed or a painted surface.

14. The method of claim 11 wherein the substance is wood paper, plastic, leather, a seed or a painted surface.

15. The method of claim 12 wherein a composition containing the ionene polymer is applied to the surface and the ionene polymer is present in an amount ranging from 0.01 ppm to 0.5 ppm (w/w).

16. The method of claim 31 wherein the ionene polymer is applied as a surface disinfectant.

* * * * *

UNITED STATES PATENT AND TRADEMARK OFFICE
CERTIFICATE OF CORRECTION

PATENT NO. : 5,401,881

DATED : MARCH 28, 1995

INVENTOR(S) : PUCKETT et al.

It is certified that error appears in the above-indentified patent and that said Letters Patent is hereby corrected as shown below:

On the title page:

ITEM [75] under "Inventors", the third inventor's name, "Fernando D. Corral" should read --Fernando Del Corral--.

Claim 14, col. 10, line 28, "wood paper" should read --wood, paper--.

Signed and Sealed this

Twenty-sixth Day of September, 1995

Attest:

BRUCE LEHMAN

Attesting Officer     Commissioner of Patents and Trademarks